Patented June 26, 1928.

1,675,124

UNITED STATES PATENT OFFICE.

HENRY R. MINOR, OF OSSINING, NEW YORK, ASSIGNOR TO GENERAL CARBONIC COMPANY, OF NEW YORK, N. Y., A CORPORATION OF NEW YORK.

METHOD OF TREATING RUBBER STOCK.

No Drawing.   Application filed September 11, 1926. Serial No. 134,948.

This invention relates to the use of carbon dioxid ($CO_2$), and preferably in the form of snow, to dissipate high temperatures in rubber stock that is broken down or processed and otherwise treated. More specifically, the invention relates to the treatment of rubber stock while on the mill, and has for its object the provision of an inert atmosphere for the purpose of exerting a beneficial result and cooling effect on the rubber stock undergoing a manipulation or formation. In this connection it is my purpose to manipulate the rubber stock in an inert atmosphere of carbon dioxid ($CO_2$), and in particular carbon dioxid snow, to thereby prevent the high temperatures which tend to develop, especially with the use of super-accelerators, and scorch the rubber. In other words, I relieve the high temperature peaks by carbon dioxid which at the same time exerts also a beneficial effect upon the rubber.

The mode of applying the carbon dioxid may be directly, as where the $CO_2$ snow is blown on the rubber or the mill by any suitable means, or it may be applied indirectly, that is, the carbon dioxid is applied in the form of snow or bricks on the inside of the mill rollers used in sheeting or breaking down the rubber to thus cool the rolls, while the resulting warmed carbon dioxid gas can be collected for reuse in air bags or molded tubes, or for other purposes.

Prior to my discovery, great difficulty has been experienced in the breaking down of rubber stock, due to a tendency for it to scorch because of the high temperatures set up in the modern mill. To counteract and overcome the tendency to heat, various attempts to use water at different stages of the operation, have been made, depending upon evaporation to carry off the heat. The application of water to the rubber stock, or to the goods, has been neither satisfactory nor economical, for various reasons, and the presence of water in the stock is never beneficial.

I have discovered that rubber stock may be advantageously broken down or processed in an atmosphere of carbon dioxid, and that rubber thus manipulated has a higher tensile strength and superior qualities due, no doubt, to the beneficial effect of the inert atmosphere and the decreased oxidation, and because of the proper dissipation of heat. I have further discovered that carbon dioxid may be applied by spraying directly on the rubber, preferably as snow, in required amounts, to effect the necessary cooling and to provide the inert atmosphere in which the manipulation is effected. I have also discovered that carbon dioxid may be used in the form of snow driven directly through the rolls in the manner above stated, and the inert gas may then be recovered for reuse.

I further find that carbon dioxid may be applied directly, as by spraying, or it may be applied above the mill on the rubber itself, providing that the carbon dioxid exists in liquid form in its source of supply, and in its expansion is partly enclosed so that it freezes itself. The cooling effect is thus applicable directly on the rubber at the seat of trouble, to thereby prevent scorching. The rate at which carbon dioxid snow is permitted to form is, of course, dependent upon the construction of the apparatus used in applying the carbon dioxid, and may be effected by any suitable means such, for example, as the apparatus disclosed and claimed in my pending application, Serial No. 58,736, filed September 26, 1925, for fire extinguishers. In that case the hood is applied directly on the mill, or over the rubber itself as may be required. Carbon dioxid then is permitted to discharge as required, and due to its high heat capacity, the temperature of the rubber and the apparatus is readily controlled with practically no loss of $CO_2$.

In place of the use of carbon dioxid, in the form of loose snow, I find that for certain work, as for the cooling of rubber goods, hose, and the like, carbon dioxid snow formed into a brick is most efficient. This mode of cooling while at the same time protecting the rubber from oxidation or other deleterious effects is most efficient and desirable for producing a superior grade of rubber of high tensile strength and uniform texture.

While I have given specific examples of applying carbon dioxid to obtain its beneficial effects and to control the temperature of the rubber, I do not thereby desire to be understood as having limited myself, as various modes of operation whereby the cooling and beneficial effect on rubber while processed or otherwise manipulated in the presence of $CO_2$, exist. While I have specifically disclosed my invention in connection with the treatment of crude rubber in the mill I consider that my process is applicable at any time during the manipulation of rubber where the beneficial effects and the temperature control of the rubber are desired by the use of carbon dioxid either in a gaseous or solid form. In other words, my invention is not specifically limited to the use of carbon dioxid during the breaking down operation of the rubber.

What I claim therefore, as new and useful, of my own invention and desire to secure by Letters Patent is:—

1. The method of processing or breaking down heated rubber stock, which comprises causing carbon dioxid to freeze or solidify itself, and then utilizing said solidified carbon dioxid to control the temperatures of the rubber during the processing.

2. The method of processing or breaking down heated rubber stock, which comprises causing carbon dioxid to freeze or solidify itself and then causing the solidified carbon dioxid to effect an exchange of temperatures with the heated rubber stock on the mill, and then recovering the carbon dioxid for reuse.

3. The method of manipulating rubber stock and rubber goods to control peak temperatures and to beneficially react on said rubber stock and goods, which comprises manipulating said rubber in the presence of carbon dioxid in solidified form.

4. The method of manipulating rubber stock and rubber goods to control peak temperatures and to beneficially react on said rubber stock and goods, which consists in manipulating said rubber stock and goods, and during the manipulation applying carbon dioxid in solidified form to the stock or goods, and permitting said solidified carbon dioxid to be converted to a gaseous state and causing said gaseous carbon dioxid to envelope the rubber stock or goods.

5. A method of processing rubber which consists in manipulating the rubber material to break it down, and, during such manipulation, spraying carbon dioxid snow on to the mass in regulated quantities to control the temperature of the same and improve the quality of the product.

In testimony whereof I have hereunto set my hand on this 24th day of August A. D., 1926.

HENRY R. MINOR.